(12) United States Patent
Lin et al.

(10) Patent No.: US 8,330,933 B2
(45) Date of Patent: Dec. 11, 2012

(54) LIQUID CRYSTAL LENS STRUCTURE AND METHOD OF DRIVING SAME

(75) Inventors: Yi-Hsin Lin, Zhubei (TW); Hung-Chun Lin, Lugu Township (TW)

(73) Assignee: National Chiao Tung University, Hsinchu (TW)

( * ) Notice: Subject to any disclaimer, the term of this patent is extended or adjusted under 35 U.S.C. 154(b) by 103 days.

(21) Appl. No.: 13/096,443

(22) Filed: Apr. 28, 2011

(65) Prior Publication Data

US 2012/0140128 A1      Jun. 7, 2012

(30) Foreign Application Priority Data

Dec. 7, 2010   (TW) ................ 99142532 A

(51) Int. Cl.
*G02F 1/13*       (2006.01)

(52) U.S. Cl. ........................................... 349/200

(58) Field of Classification Search .................... 349/200
See application file for complete search history.

(56) References Cited

U.S. PATENT DOCUMENTS

2007/0139333 A1    6/2007   Sato

OTHER PUBLICATIONS

Susumu Sato, Liquid-Crystal Less-Cells With Variable Focal Length, Japanese Journal of Applied Physics, Sep. 1979, pp. 1679-1684, vol. 18, No. 9, Japan.

*Primary Examiner* — Phu Vu

(74) *Attorney, Agent, or Firm* — Wang Law Firm, Inc.; Li K. Wang; Stephen Hsu

(57) ABSTRACT

A liquid crystal (LC) lens structure and a method of driving same are disclosed. The LC lens structure includes an upper substrate, a lower substrate, a liquid crystal and polymer composite film, and an LC layer. The upper substrate is provided with a first conducive layer and a first alignment layer; and the lower substrate is provided with a second conductive layer and a second alignment layer. The liquid crystal and polymer composite film is arranged at one side of the first alignment layer to form a first lens, and the LC layer is arranged between the liquid crystal and polymer composite film and the second alignment layer to form a second lens. By building the liquid crystal and polymer composite film in the LC lens structure, it is able to realize an LC lens with low operating voltage and large focusing range.

17 Claims, 16 Drawing Sheets

LIQUID CRYSTAL LENS STRUCTURE AND METHOD OF DRIVING SAME

FIELD OF THE INVENTION

The present invention relates to a liquid crystal (LC) lens structure and a method of driving same, and more particularly to a LC lens structure having an built-in liquid crystal and polymer composite film (LCPCF) and to a method of driving same.

BACKGROUND OF THE INVENTION

Cameras, mobile phone cameras and 3D-image processing devices often utilize a zoom lens to automatically focus, enlarge or reduce an image, so as to obtain a desired image. Conventionally, a zoom lens has multiple lens groups. These lens groups move along an optical axis of the lens to thereby change the spaces among them and accordingly, the overall focal length of the lens without affecting the imaging distance thereof. However, this type of lens needs relatively long lens group movement distance, and the movement distances of the lens groups are not in a linear relationship. Therefore, the zoom lens has difficulties in the structural design and control precision thereof, and has high manufacturing cost that could not be easily lowered. Currently, a liquid lens or liquid crystal lens (LC lens) has been used to improve the movement distances of lens groups in order to obtain reduced camera size.

According to the general principle of liquid lens, the liquid lens includes a tunable liquid-filled lens and a solid lens. By changing the shape of the liquid-filled lens to be a biconvex lens or a biconcave lens, or by using filling media of different refractive indexes, it is able to tune the focal length of the lens and achieve the purpose of zooming. Or, by using the liquid crystal-filled lens and changing the refractive index of the liquid crystal with an applied electric field, an electrically tunable-focus LC lens can be realized, such as the LC lens revealed in Susumu Sato: "Liquid-crystal Lens-cells with Variable Focal Length", Japanese Journal of Applied Physics, published on Mar. 12, 1979.

Another prior art optical element is disclosed in US2007/0139333, which includes a first substrate having a first electrode, a second substrate, a second electrode arranged outside the second substrate and having a hole, and a liquid crystal layer provided between the first and the second substrate. The first electrode and the second electrode are electrically connected to each other. By applying a voltage to the liquid crystal layer, it is able to change an orientation of liquid crystal molecules in the liquid crystal layer. Further, a dielectric layer and a third electrode are arranged on the second substrate. With the third electrode, it is able to regulate image quality and tune lens focal length. However, the optical element disclosed in US2007/0139333 has the following disadvantages:

(1) Having complicated structure to increase the manufacturing cost thereof; and (2) Requiring high driving voltage to thereby increase the driving circuit cost and power consumption thereof.

SUMMARY OF THE INVENTION

A primary object of the present invention is to provide a liquid crystal (LC) lens structure and a method of driving same, so as to overcome the problems in the prior art LC lenses, such as complicated electrode design, high operating voltage, large volume and thickness, and lower the shortest focal length.

To achieve the above and other objects, the LC lens structure according to the present invention includes an upper substrate, a lower substrate, a liquid crystal and polymer composite film, and an LC layer. The upper substrate is provided with a first conductive layer and a first alignment layer; the first conductive layer is located at one side of the upper substrate, and the first alignment layer is located at one side of the first conductive layer opposite to the upper substrate. The lower substrate is provided with a second conductive layer and a second alignment layer; the second conductive layer is located at one side of the lower substrate, and the second alignment layer is located at one side of the second conductive layer opposite to the lower substrate. The liquid crystal and polymer composite film is arranged at one side of the first alignment layer opposite to the first conductive layer to form a first lens; and the liquid crystal (LC) layer is arranged between the liquid crystal and polymer composite film and the second alignment layer to form a second lens.

According to the present invention, the liquid crystal and polymer composite film is formed of liquid crystal and monomers of a polymer, and the liquid crystal and polymer composite film is a birefringent film.

According to the present invention, the first conductive layer is formed with a hole having a diameter of 2 mm, so that the liquid crystal and polymer composite film has equivalent refractive index and dielectric constant distributed in circular symmetry due to a non-uniform electric field distribution during manufacturing of the LC lens structure. The liquid crystal and polymer composite film within the hole has relatively smaller dielectric constant and relatively larger equivalent refractive index, while the liquid crystal and polymer composite film surrounding the hole has relatively larger dielectric constant and relatively smaller equivalent refractive index.

According to the present invention, the liquid crystal and polymer composite film can have uniform dielectric constant distribution or non-uniform dielectric constant distribution.

According to the present invention, the first lens can be a positive lens or a negative lens.

The LC lens structure of the present invention can be applied in a mini projector, a mobile phone camera system, eye glasses, or any portable device requiring an electrically tunable-focus element.

According to an embodiment of the present invention, the LC lens structure has an operating voltage range from 15 Vrms to 35 Vrms.

To achieve the above and other objects, the driving method according to the present invention is used to drive an LC lens structure and includes the following steps: providing a first operating voltage; and switching the first operating voltage to a second operating voltage.

According to an embodiment of the driving method, the first operating voltage is 15 Vrms and the second operating voltage is 35 Vrms. Thus, the operating voltage applied across the LC lens structure can be switched from 15 Virus to 35 Vrms.

According to another embodiment of the driving method, the first operating voltage is 35 Vrms and the second operating voltage is 15 Vrms. Thus, the operating voltage applied across the LC lens structure can be switched from 35 Vrms to 15 Vrms.

According to the present invention, the driving method further includes a step of switching the second operating voltage to a third operating voltage. Thus, the operating voltage applied across the LC lens structure can be switched from 15 Vrms to 55 Vrms, and then switched from 55 Vrms to 35 Vrms. Alternatively, the operating voltage applied across the LC lens structure can be switched from 35 Vrms to 0 Vrms, and then switched from 0 Vrms to 15 Vrms.

With the above arrangements, the LC lens structure and method of driving same according to the present invention provides one or more of the following advantages:

(1) The LC lens structure has simple structure and can be driven using one single operating voltage via the driving method;

(2) The LC lens structure uses a liquid crystal and polymer composite film to replace glass, so as to reduce the divided voltage at non-LC layers and can therefore have a relatively low operating voltage;

(3) The LC lens structure has simple overall structure and small thickness; and (4) The LC lens structure can use a polymeric film to produce different initial focal length for tuning focal range.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
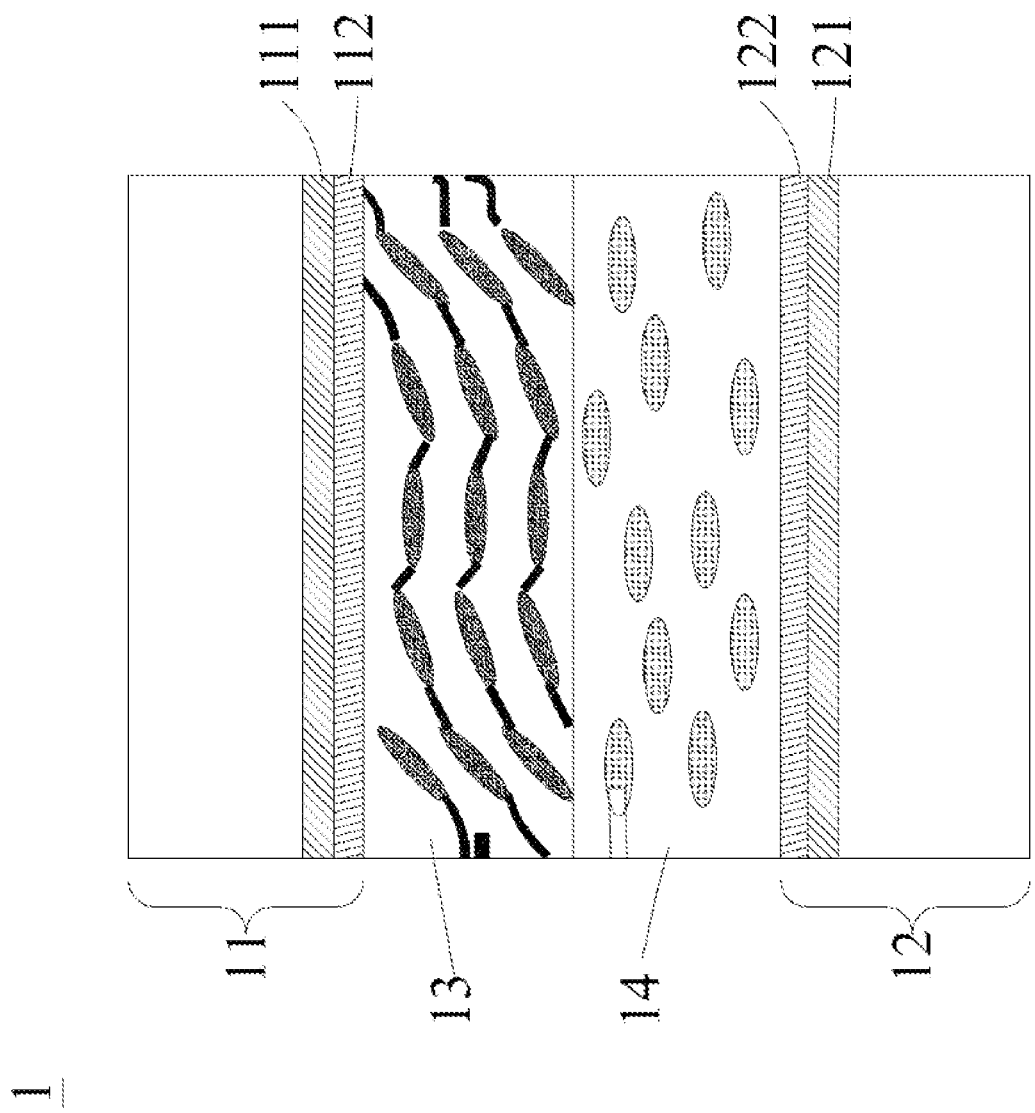
FIG. 1 is a conceptual view of a liquid crystal (LC) lens structure according to a first embodiment of the present invention.

The present invention will now be described with some preferred embodiments thereof and with reference to the accompanying drawings. For the purpose of easy to understand, elements that are the same in the preferred embodiments are denoted by the same reference numerals. Please refer to FIG. 1 that is a conceptual view of a liquid crystal (LC) lens structure according to a first embodiment of the present invention. As shown, the LC lens structure is generally denoted by reference numeral 1, and includes an upper substrate 11, a lower substrate 12, a liquid crystal and polymer composite film 13, and a liquid crystal (LC) layer 14.

The upper substrate 11 can have a first conductive layer 111 and a first alignment layer 112 provided thereon. The first conductive layer 111 is located at one side of the upper substrate 11, and the first alignment layer 112 is located at one side of the first conductive layer 111 opposite to the upper substrate 11. Similarly, the lower substrate 12 can have a second conductive layer 121 and a second alignment layer 122 provided thereon. The second conductive layer 121 is located at one side of the lower substrate 12, and the second alignment layer 122 is located at one side of the second conductive layer 121 opposite to the lower substrate 12. According to the present invention, the upper substrate 11 and the lower substrate 12 can be two glass substrates, on each of which an indium tin oxide (ITO) layer can be coated so as to serve as the first conductive layer 111 on the upper substrate 11 and the second conductive layer 121 on the lower substrate 12.

The liquid crystal and polymer composite film 13 can be formed of liquid crystal and monomers of a polymer, and is a birefringent film. The liquid crystal and polymer composite film 13 is provided at one side of the first alignment layer 112 opposite to the first conductive layer 111, and has equivalent refractive index and dielectric constant distributed in circular symmetry. Therefore, the liquid crystal and polymer composite film 13 can form a first lens due to its refractive index distribution and has an initial focal length. In other words, the first lens can be a positive lens or a negative lens depending on its refractive index distribution.

The LC layer 14 is located between the liquid crystal and polymer composite film 13 and the second alignment layer 122, and forms a second lens also due to its refractive index distribution and has a focal length. Thus, the LC lens structure 1 has a total focal length equal to a combination of the initial focal length of the liquid crystal and polymer composite film 13 and the focal length of the LC layer 14.

Figure 2:
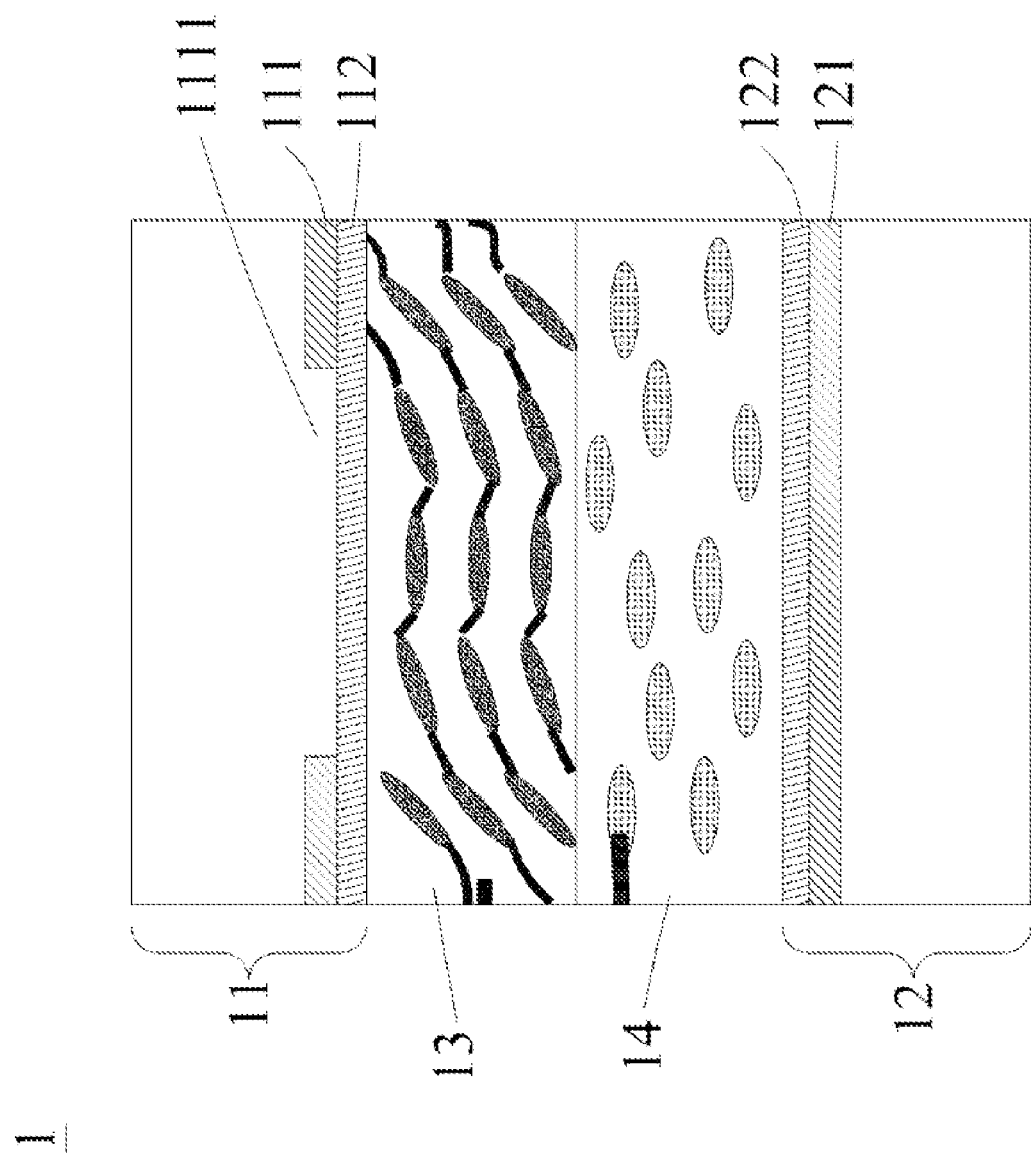
FIG. 2 is a conceptual view of an LC lens structure according to a second embodiment of the present invention.

Please refer to FIG. 2 that is a conceptual view of an LC lens structure 1 according to a second embodiment of the present invention. The LC lens structure 1 in the second embodiment is generally structurally similar to the first embodiment, except that the first conductive layer 111 in the second embodiment is further provided with a round hole 1111 about 2 mm in diameter. Thus, when a power supply is provided to the first conductive layer 111 and the second conductive layer 121, an electric field distribution in circular symmetry is generated; and the liquid crystal and polymer composite film 13 within the round hole 1111 has relatively smaller dielectric constant and relatively larger equivalent refractive index, while the liquid crystal and polymer composite film 13 surrounding the round hole 111 has relatively larger dielectric constant and relatively smaller equivalent refractive index; or alternatively, the liquid crystal and polymer composite film 13 within the round hole 1111 has relatively larger dielectric constant and relatively smaller equivalent refractive index, while the liquid crystal and polymer composite film 13 surrounding the round hole 111 has relatively smaller dielectric constant and relatively larger equivalent refractive index. It is noted the hole 1111 is preferably round in shape but not limited thereto.

Figure 3A:
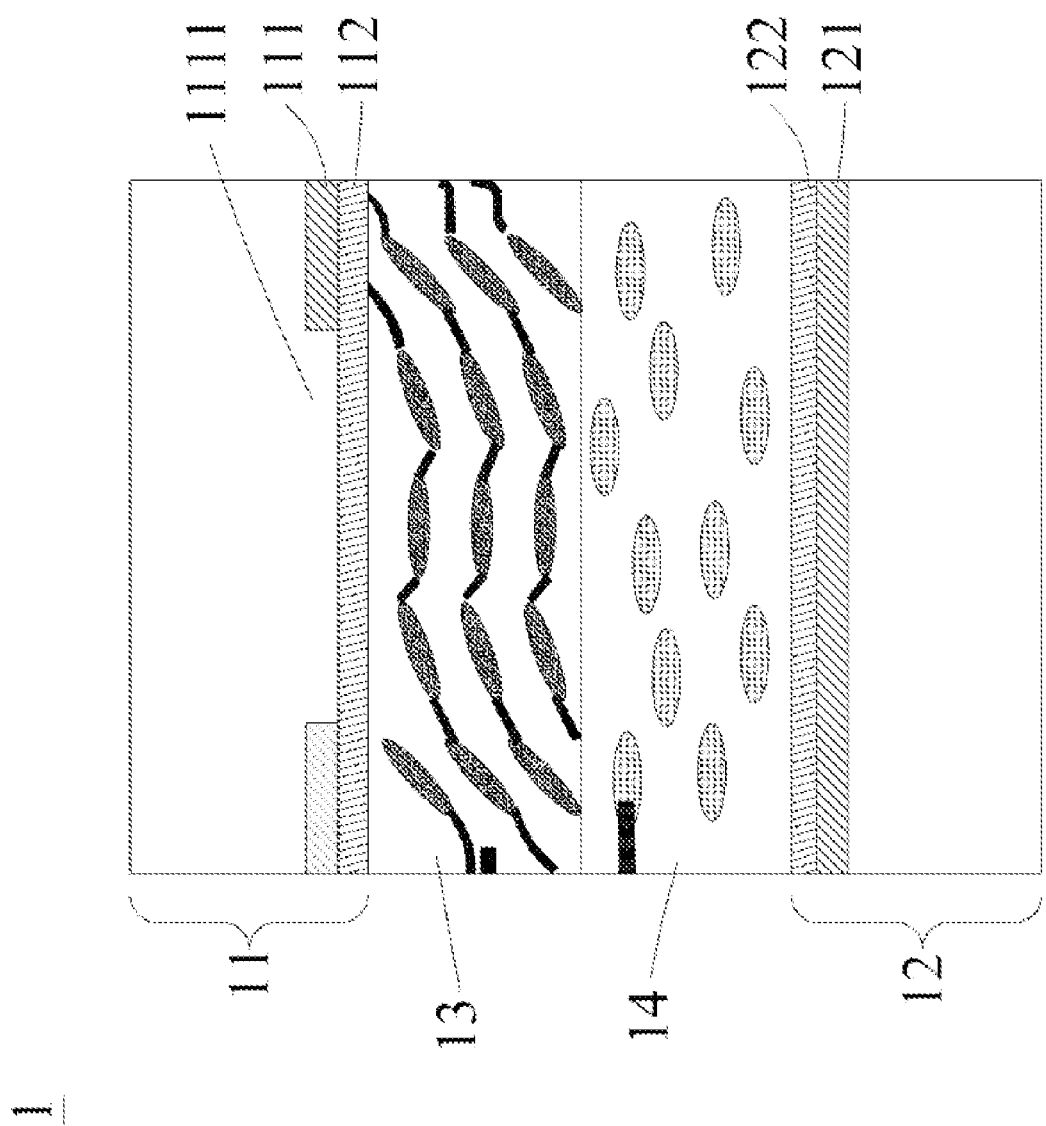
FIG. 3a is a conceptual view showing a first embodiment of a liquid crystal and polymer composite film used in the LC lens structure of the present invention.
Figure 3B:
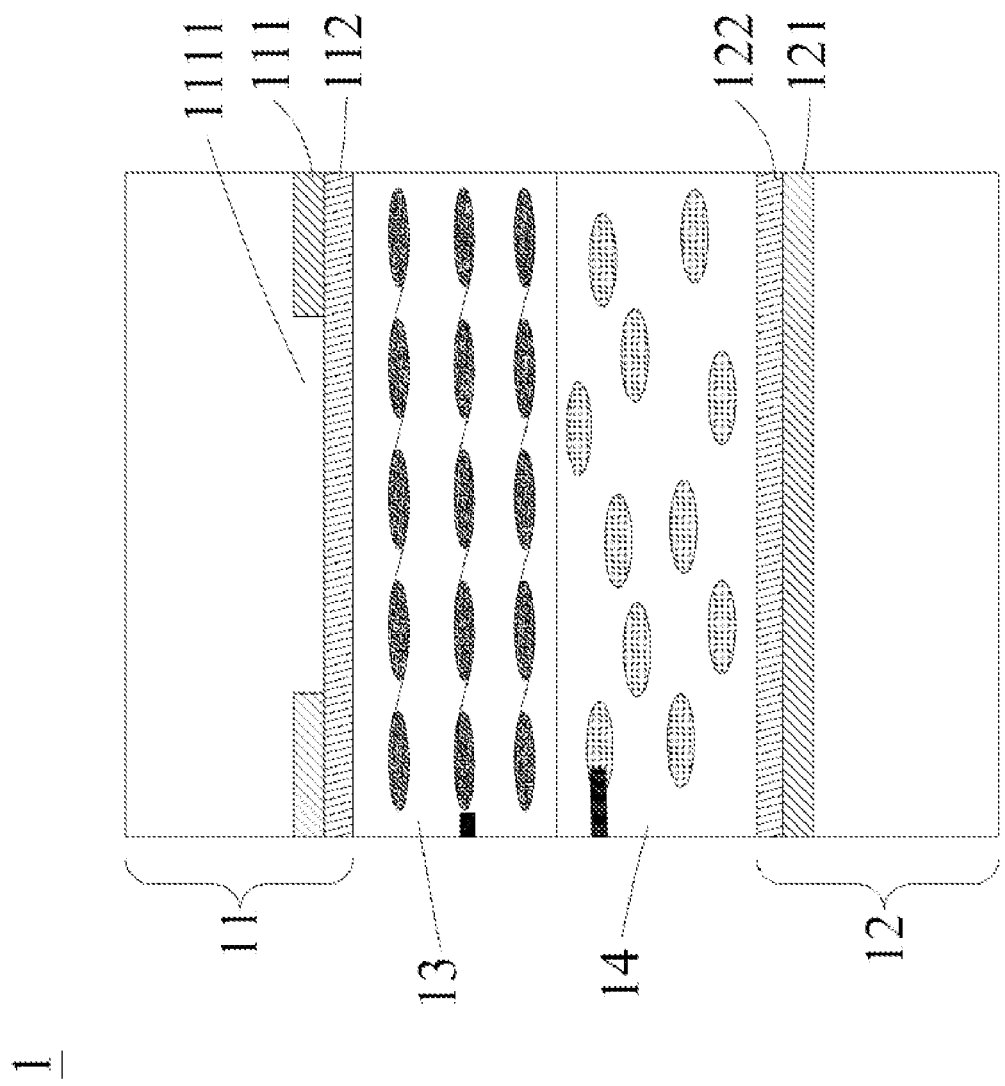
FIG. 3b is a conceptual view showing a second embodiment of the liquid crystal and polymer composite film used in the LC lens structure of the present invention.
Figure 3C:
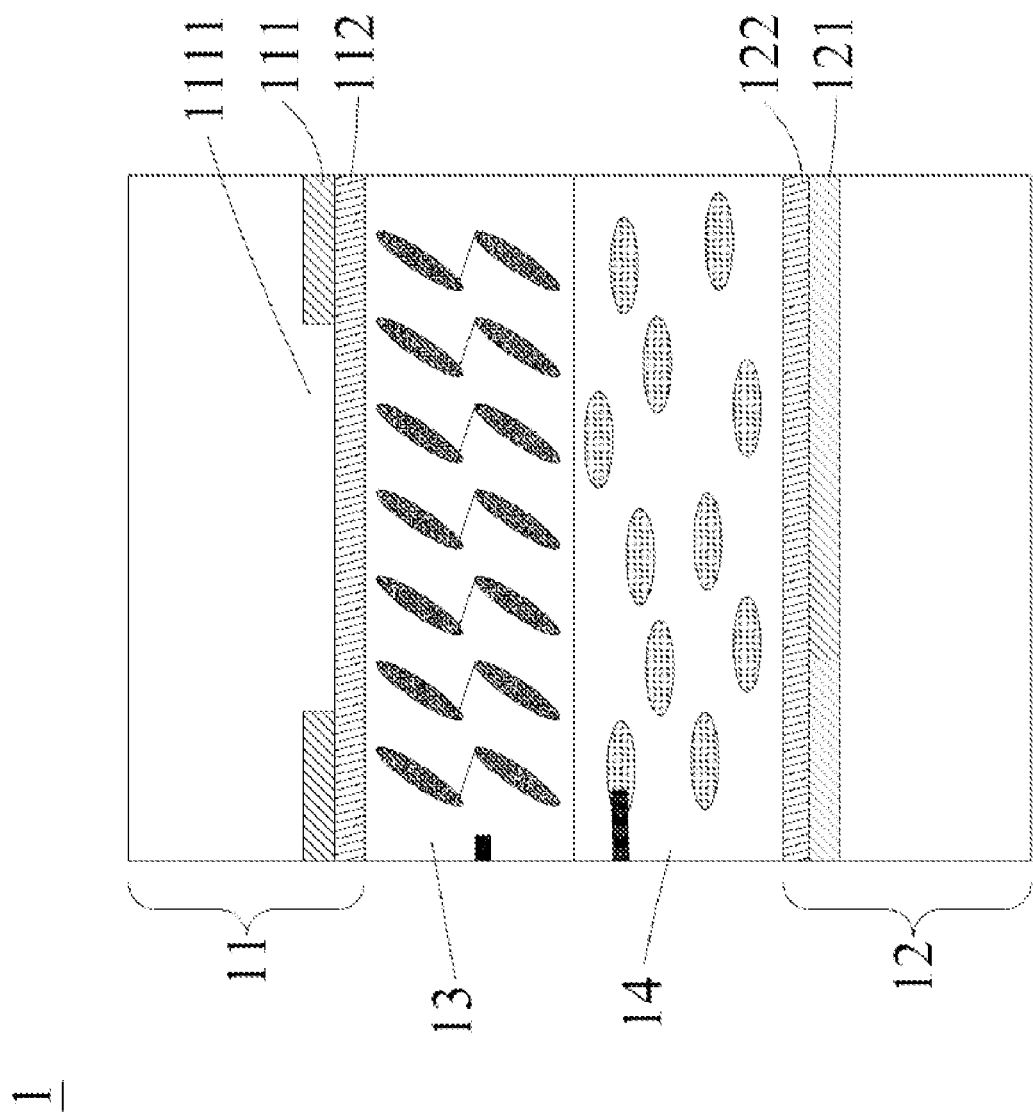
FIG. 3c is a conceptual view showing a third embodiment of the liquid crystal and polymer composite film used in the LC lens structure of the present invention.

Please refer to FIGS. 3a to 3c that are conceptual views respectively showing a first, a second and a third embodiment of the liquid crystal and polymer composite film used in the LC lens structure of the present invention. As shown, the liquid crystal and polymer composite films 13 in the second and the third embodiment shown in FIGS. 3b and 3c have uniform dielectric constant distribution, while the liquid crystal and polymer composite film 13 in the first embodiment shown in FIG. 3a has non-uniform dielectric constant distribution.

Please note the hole 1111 on the first conductive layer 111 is formed to provide a non-uniform electric field, and is not a prerequisite element. It is obvious one of ordinary skill in the art can change the dielectric constant distribution of the liquid crystal and polymer composite film 13 to be uniform distribution or non-uniform distribution in order to achieve the LC lens structure 1 with improved focusing effect.

Figure 4A:
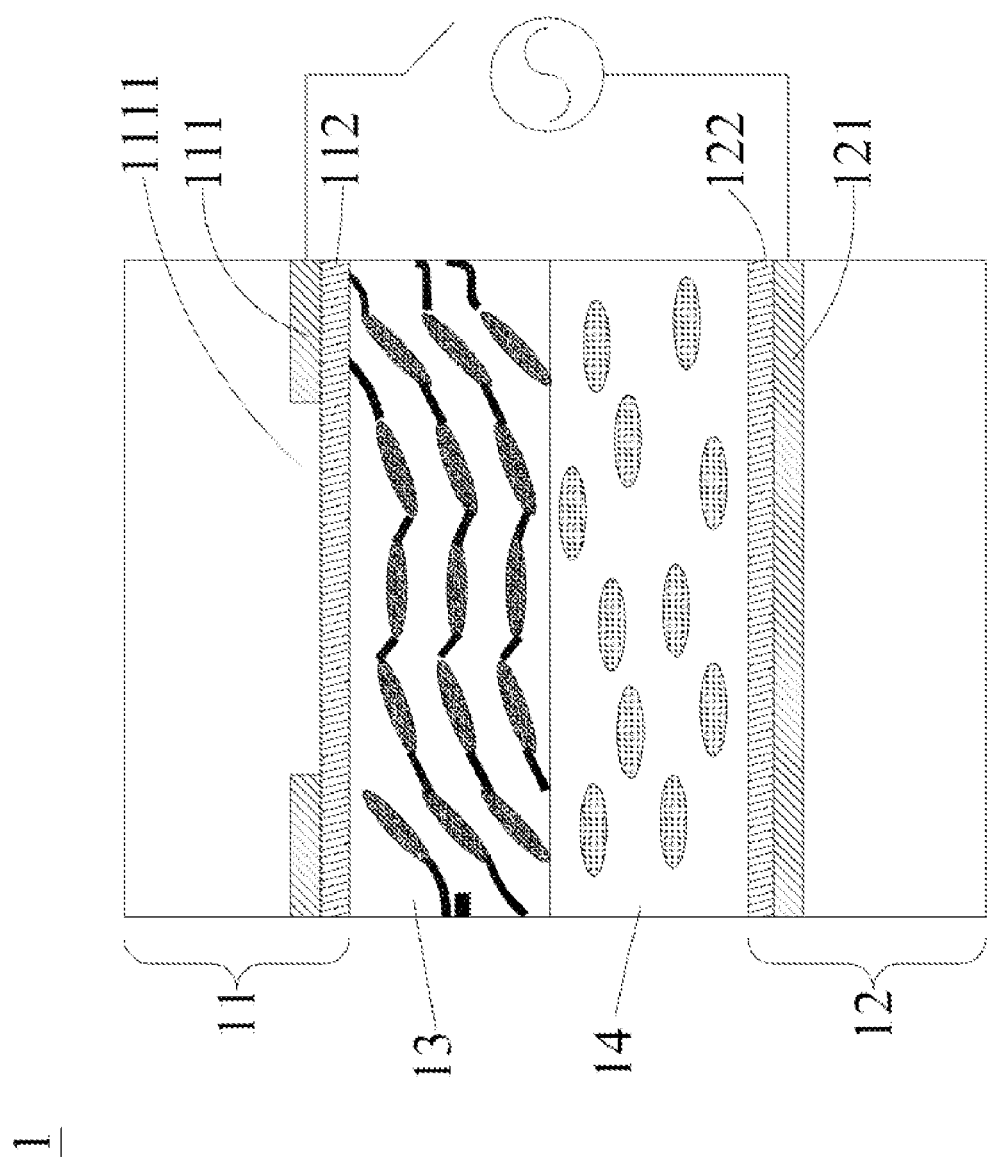
FIG. 4a shows the LC lens structure of the present invention with no applied voltage.
Figure 4B:
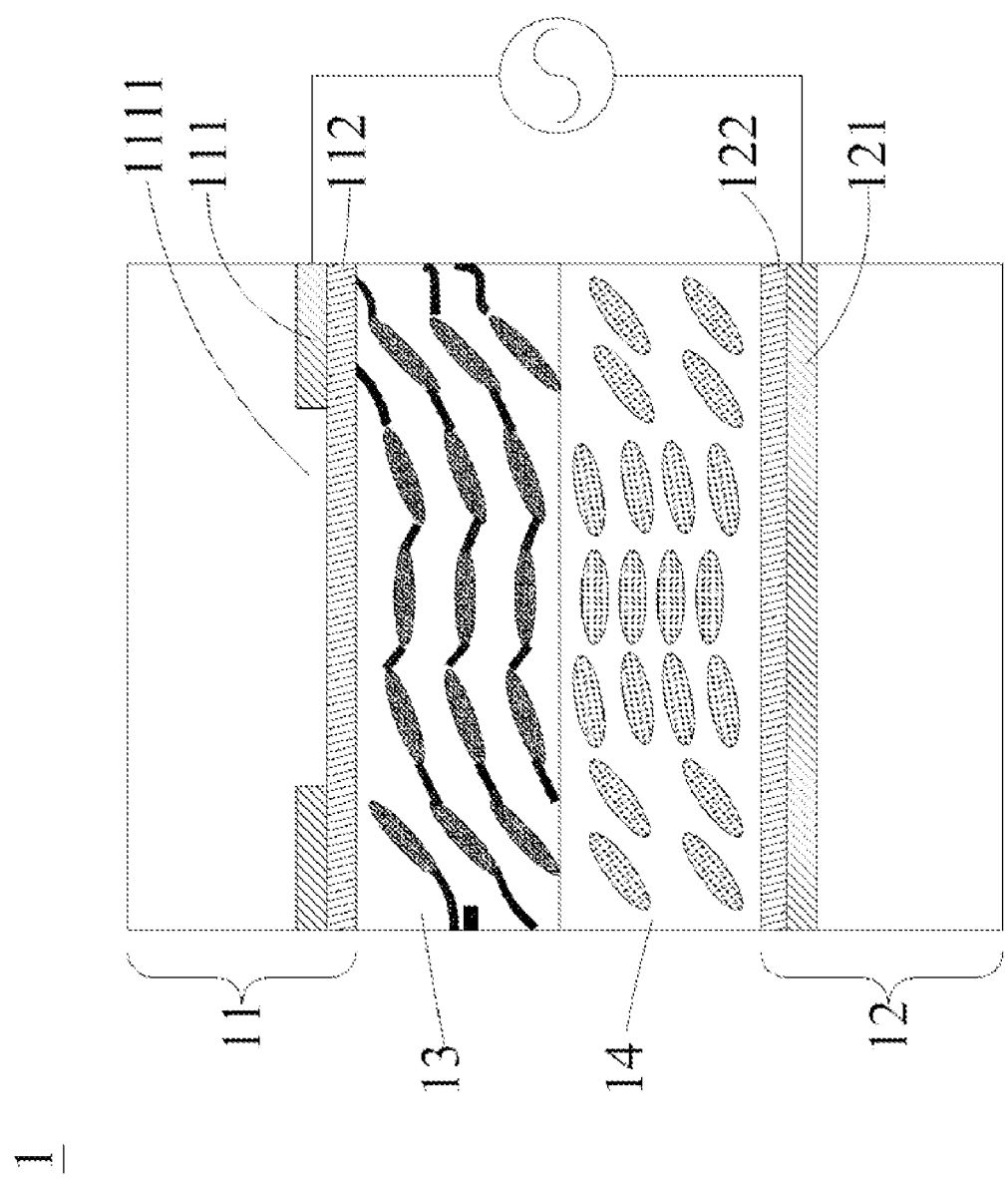
FIG. 4b shows the LC lens structure of the present invention with applied voltage.

FIGS. 4a and 4b respectively show the LC lens structure of the present invention with no and with applied voltage. Since the first conductive layer 111 is provided with a round hole 1111, an electric field distribution in circular symmetry will be generated when a power supply is provided to the LC lens structure 1. Thus, with the electric field distribution in circular symmetry, it is able to reorient LC molecules in the LC layer 14 to thereby change the total focal length of the lens structure.

The LC lens structure 1 with no applied voltage has a focal length of 8.82 cm. When the LC lens structure 1 is applied with voltage, a shortest focal length of 4.41 cm can be obtained when the applied voltage is 35 Vrms. Therefore, it can be deduced the LC layer 14 has a focal length from infinite long to 8.82 cm.

Figure 5A:
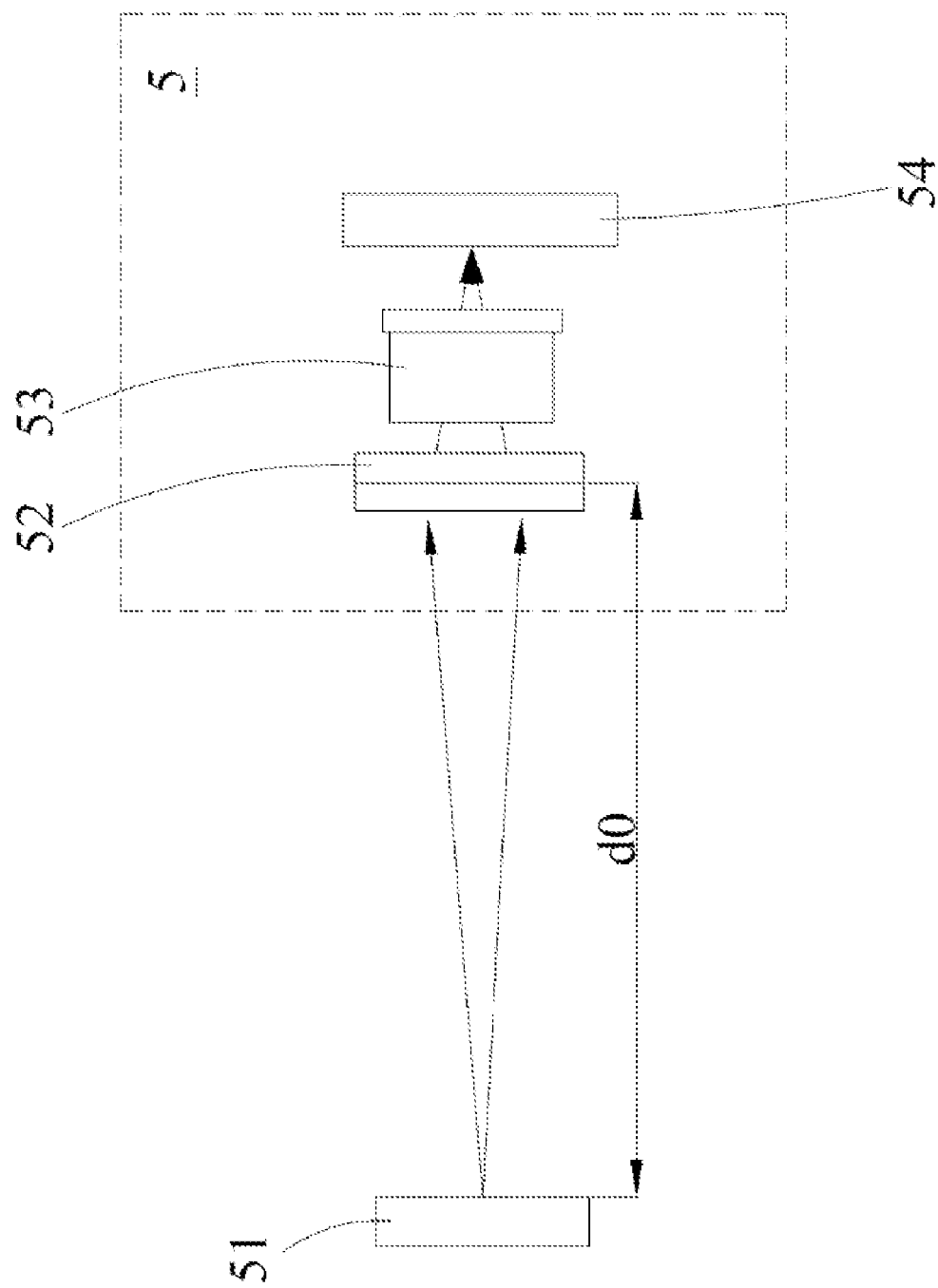
FIG. 5a is a structural diagram showing the application of the LC lens structure of the present invention in a compact camera module.
Figure 5B:
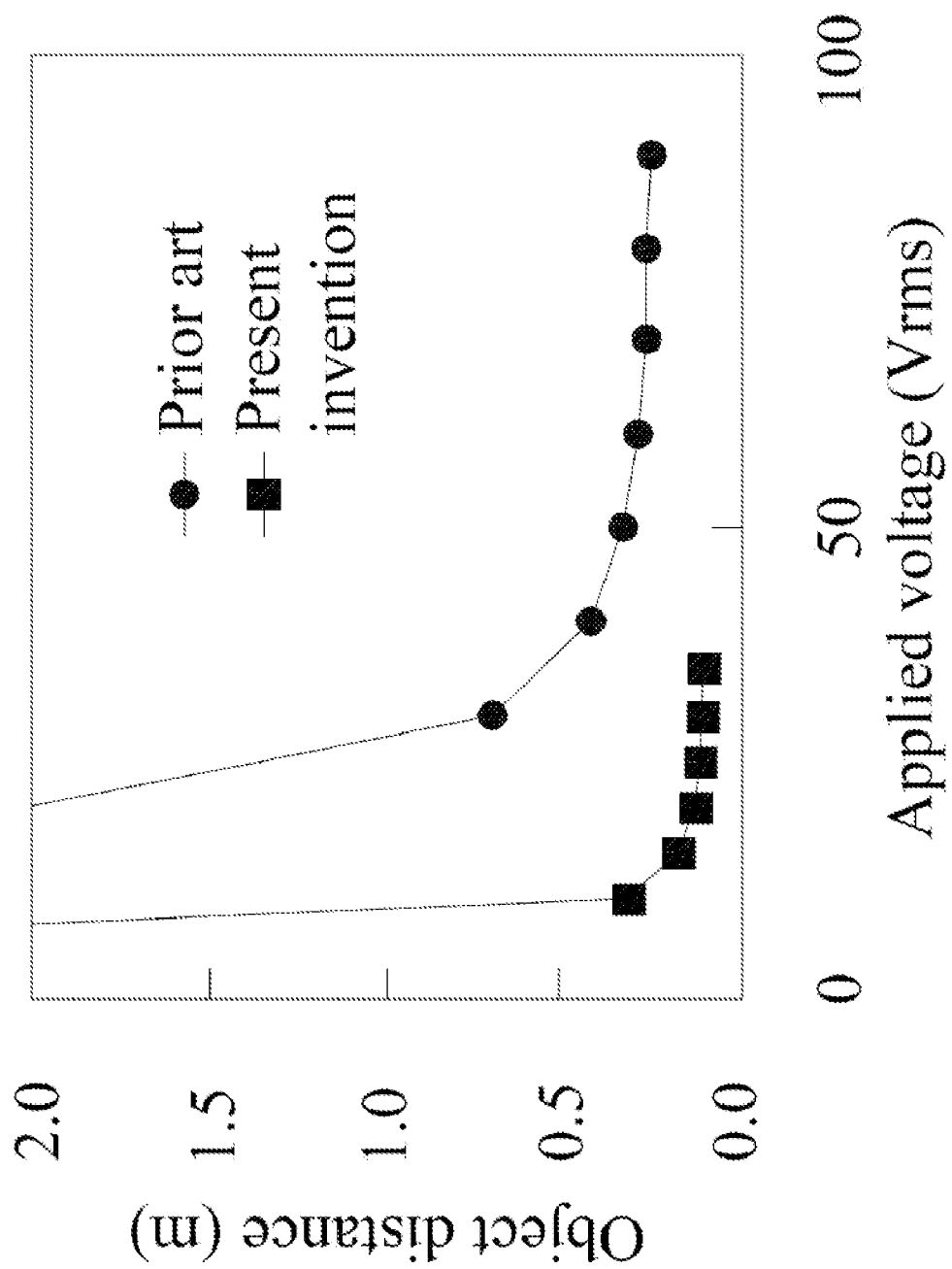
FIG. 5b is a graph showing a relation between an object distance and a voltage applied across the LC lens structure of the present invention when the LC lens structure is applied in the compact camera module and arranged at an object side.

Please refer to FIGS. 5a and 5b. FIG. 5a is a structural diagram showing the application of the LC lens structure of the present invention in a compact camera module; and FIG. 5b is a graph showing a relation between an object distance and a voltage applied across the LC lens structure of the present invention when the LC lens structure is applied in the compact camera module and arranged at an object side.

As can be seen from FIG. 5a, an image system 5 includes an LC lens structure 52, a lens group 53, and an image sensor 54. An object 51 is imaged for a first time via the LC lens structure 52, and is then imaged for a second time via the lens group 53, so that the image of the object 51 is focused on the image sensor 54. For different object distances $d_o$, the LC lens 52 can be tuned in its focal length to achieve the same focusing effect. From FIG. 5b, it can be seen that, the farthest focusing object distance is 3.5 m, and the closest focusing object distance is 8.6 cm. Since the LC lens structure 1 using the liquid crystal and polymer composite film 13 has a relatively small phase loss, it is able to have a relatively short focusing distance. In addition, when the object distance is the same, the operating voltage for the LC lens structure of the present invention is lower compared to prior art LC lenses, such as the optical element proposed by Susumu Sato.

Figure 6A:
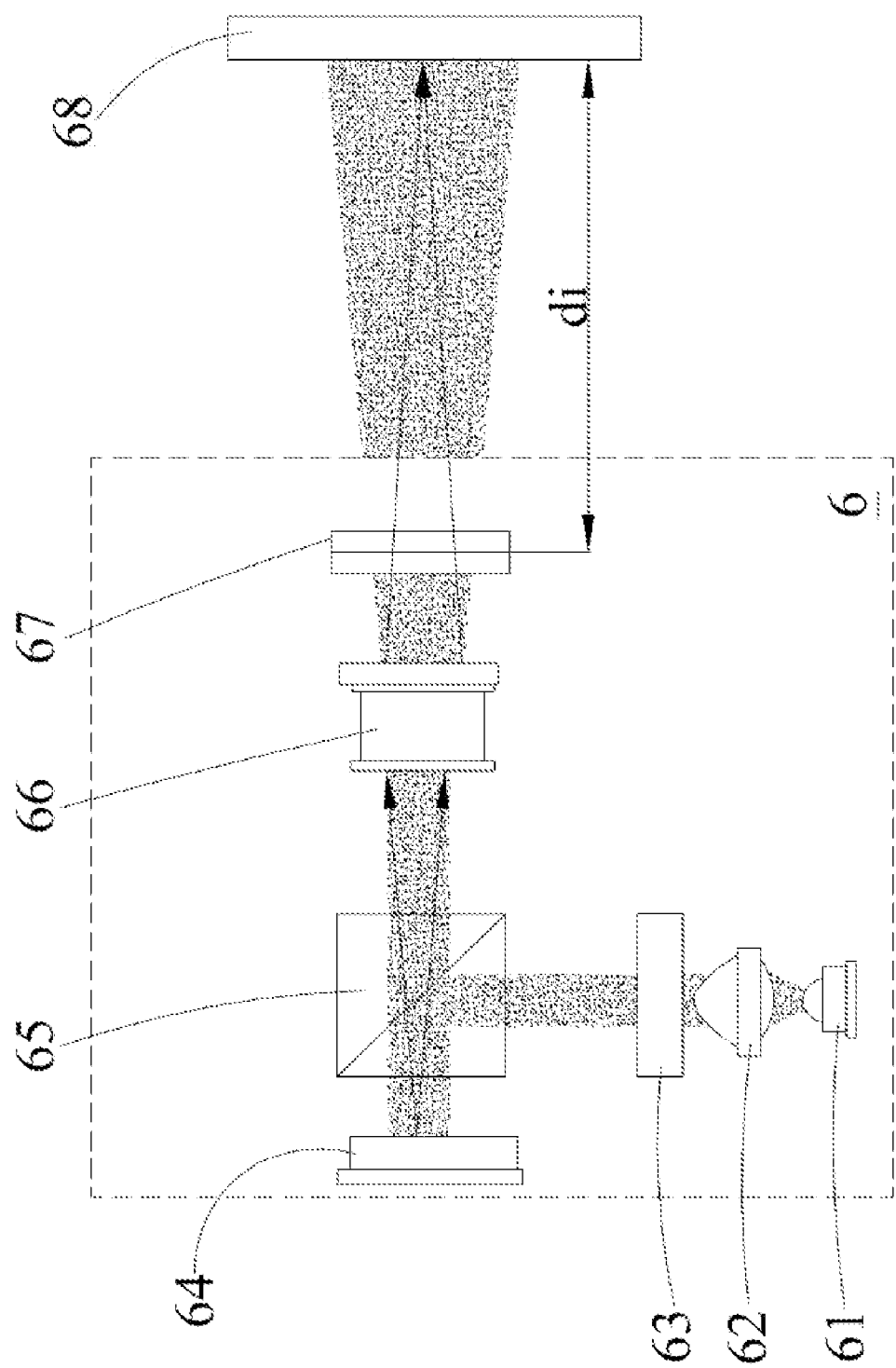
FIG. 6a is a structural diagram showing the application of the LC lens structure of the present invention in a mini projector.
Figure 6B:
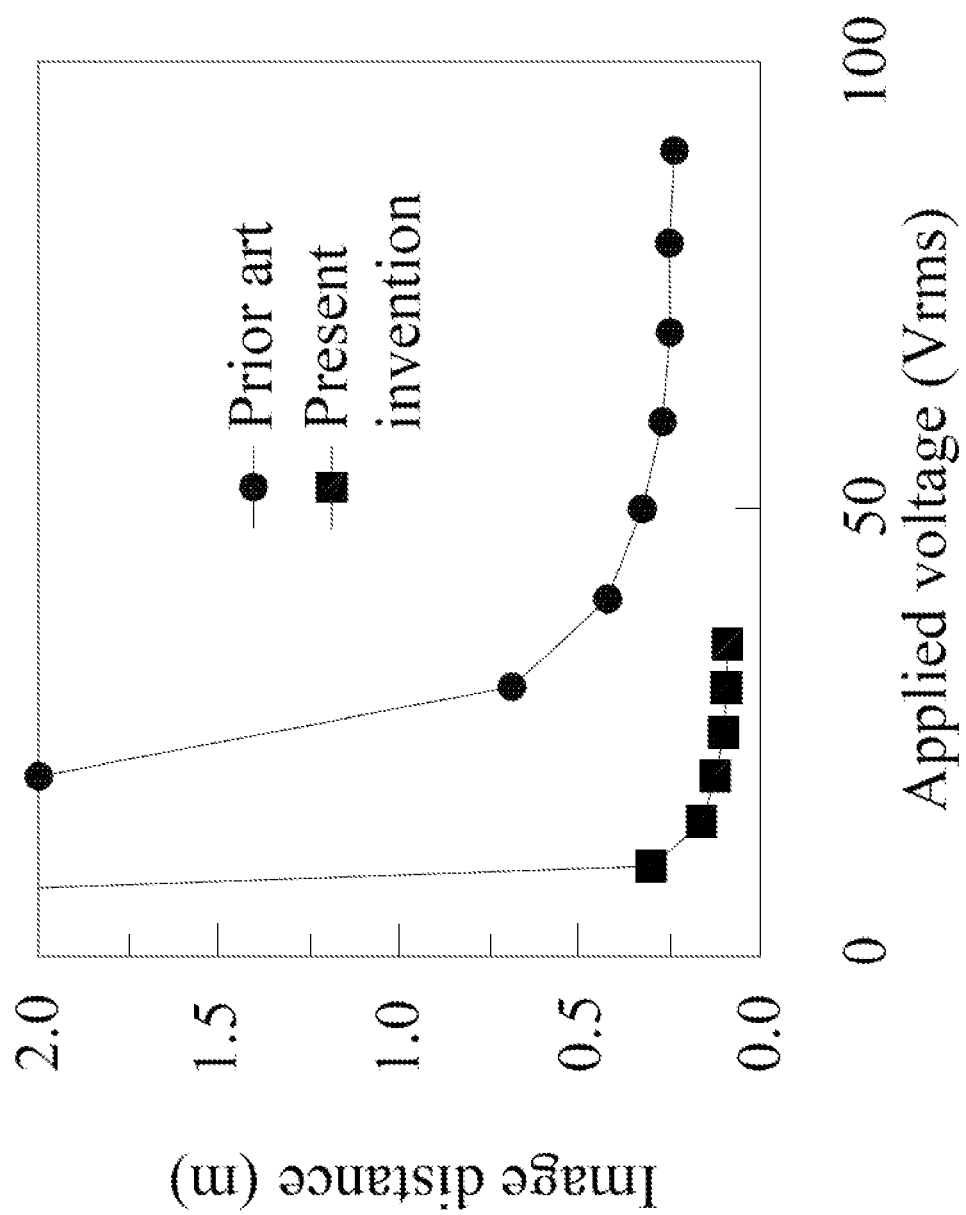
FIG. 6b is a graph showing a relation between an image distance and a voltage applied across the LC lens structure of the present invention when the LC lens structure is applied in the mini projector and arranged at an image side.

Please refer to FIGS. 6a and 6b. FIG. 6a is a structural diagram showing the application of the LC lens structure of the present invention in a mini projector, and FIG. 6b is a graph showing a relation between an image distance and a voltage applied across the LC lens structure of the present invention when the LC lens structure is applied in the mini projector and arranged at an image side.

As can be seen from FIG. 6a, a projection system 6 includes an LED light source 61, a relay lens 62, a pre-polarizer 63, an LCOS (liquid crystal on silicon) display panel 64, a polarization beam splitter (PBS) 65, a projection lens 66, and an LC lens structure 67.

An image shown on the LCOS display panel 64 is projected via the projection lens 66 and the LC lens structure 67 onto a screen 68. FIG. 6b shows the relation between an image distance $d_i$ and an operating voltage of the LC lens. As can be seen from FIG. 6b, the LC lens using the liquid crystal and polymer composite film according to the present invention has a shortest image distance for imaging that is shorter than that of prior art LC lenses. In addition, when the mini projector has an operating range from 3.5 m to 35 cm, the LC lens using the liquid crystal and polymer composite film has an operating voltage smaller than 10 Vrms, which is obviously lower than the operating voltage of 50 Vrms required by prior art LC lenses, such as the optical element proposed by Susumu Sato.

While the above embodiments are explained based on the application of the LC lens structure of the present invention in the compact camera module and the mini projector, it is understood the LC lens structure of the present invention can also be applied in other portable devices that require an electrically tunable-focus element without being limited to the illustrated embodiments.

For the purpose of highlighting the features of the present invention, the following table lists and compares the technical features and the differences between the present invention and the invention by Susumu Sato.

| | Present Invention | Sato's Invention |
|---|---|---|
| Technical Features | Using a LCPCF as an insulating layer | Using two voltages to control the optical element, and using glass as an insulating layer |
| Differences | 1) Tunable initial focal length<br>2) Small volume<br>3) Low operating voltage | 1) Fixed initial focal length, which is infinite long<br>2) Relatively large volume<br>3) High operating voltage |

As can be seen from the above table, the present invention is technically characterized in using the liquid crystal and polymer composite film as an insulating layer in the LC lens structure, and further has the significant advantages of tunable initial focal length, small volume and low operating voltage, compared to Sato's invention.

Figure 7:
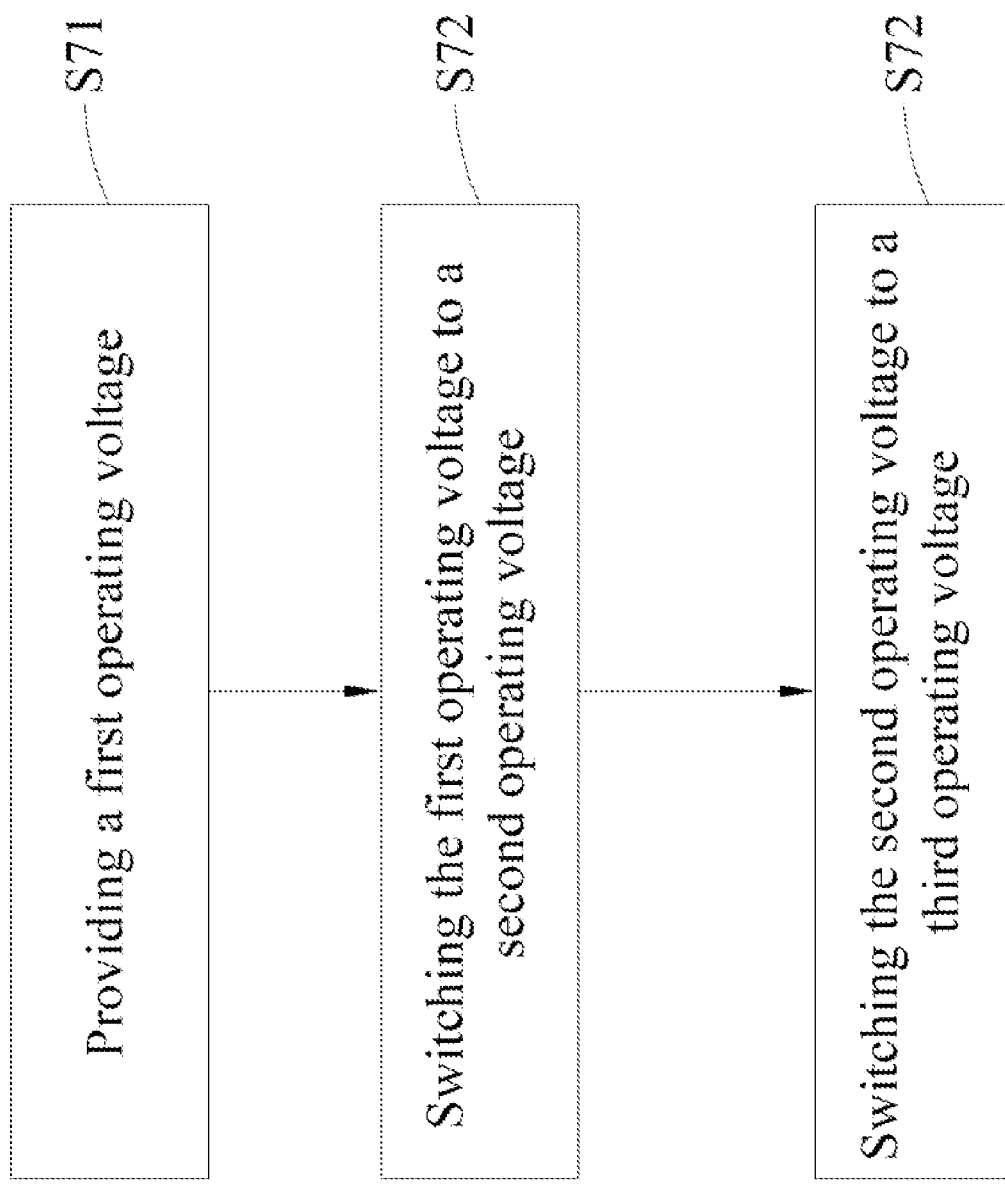
FIG. 7 is a flowchart showing the steps included in a method of driving an LC lens structure according to the present invention.

Please refer to FIG. 7 that is a flowchart showing the steps included in a driving method according to the present invention for driving an LC lens structure.

As shown, in a first step S71, a first operating voltage is provided.

In a second step S72, the first operating voltage is switched to a second operating voltage.

And, in a third step S73, the second operating voltage is switched to a third operating voltage.

It is noted the LC lens structure 1 has an optimal operating voltage range from 15 Vrms to 35 Vrms. Therefore, the following embodiments will be explained based on these two voltage limits. However, one of ordinary skill in the art can easily understand that the voltage can be switched in two stages, i.e. only between the above two voltages of 15 Vrms and 35 Vrms; or alternatively, be continuously switched between different voltage ranges, such as switched between 15 Vrms and 15.3 Vrms, between 15.3 Vrms and 15.5 Vrms, or between 15.7 Vrms and 16 Vrms.

Figure 8:
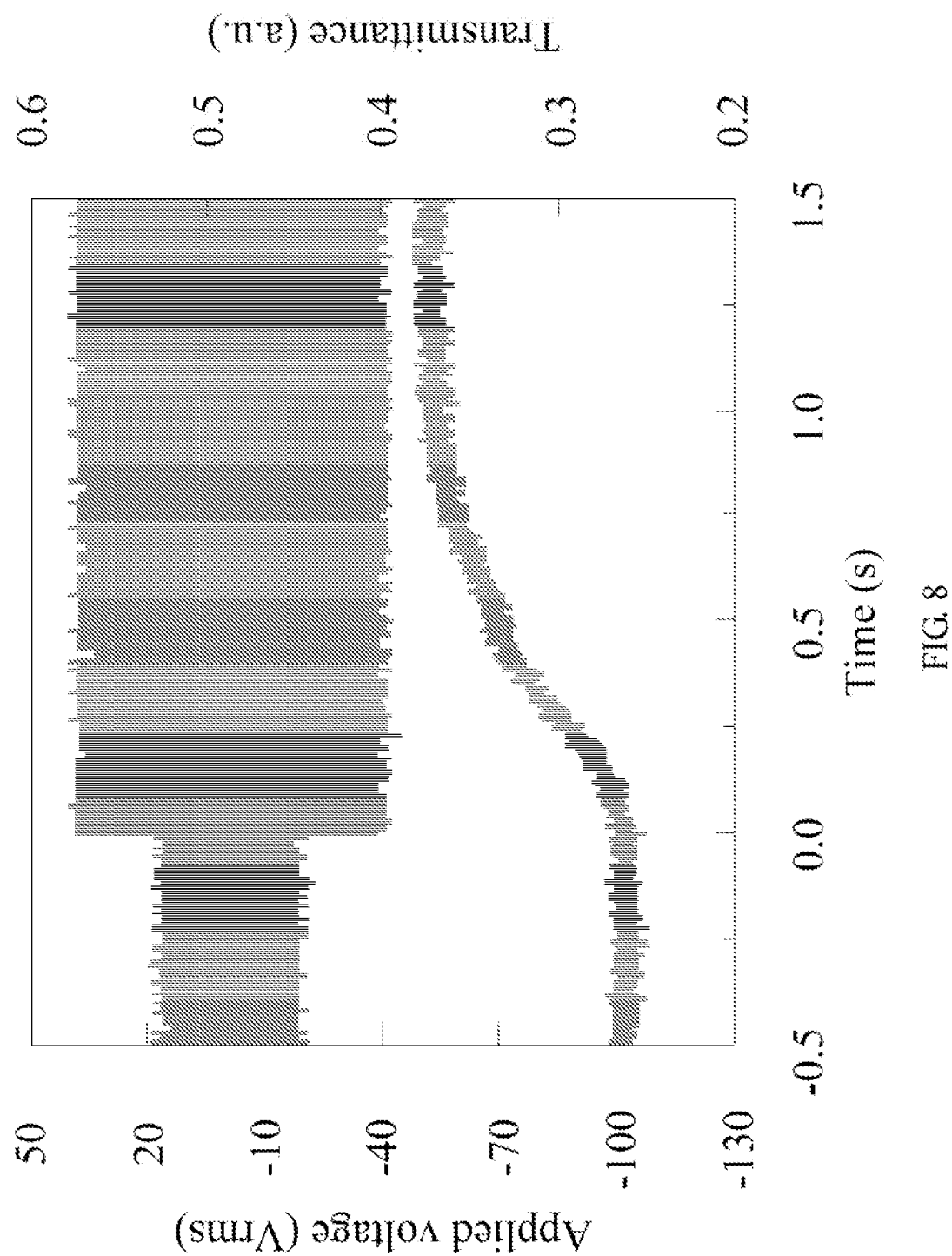
FIG. 8 is a graph showing a first embodiment of the driving method according to the present invention.

FIG. 8 is a graph showing a first embodiment of the driving method according to the present invention.

First, an operating voltage of 15 Vrms is provided.

Then, the operating voltage is switched from 15 Vrms to 35 Vrms.

In the first embodiment of the driving method, the applied voltage is switched from a lower operating voltage to a higher operating voltage with a voltage rise time of 468 ins.

Figure 9:
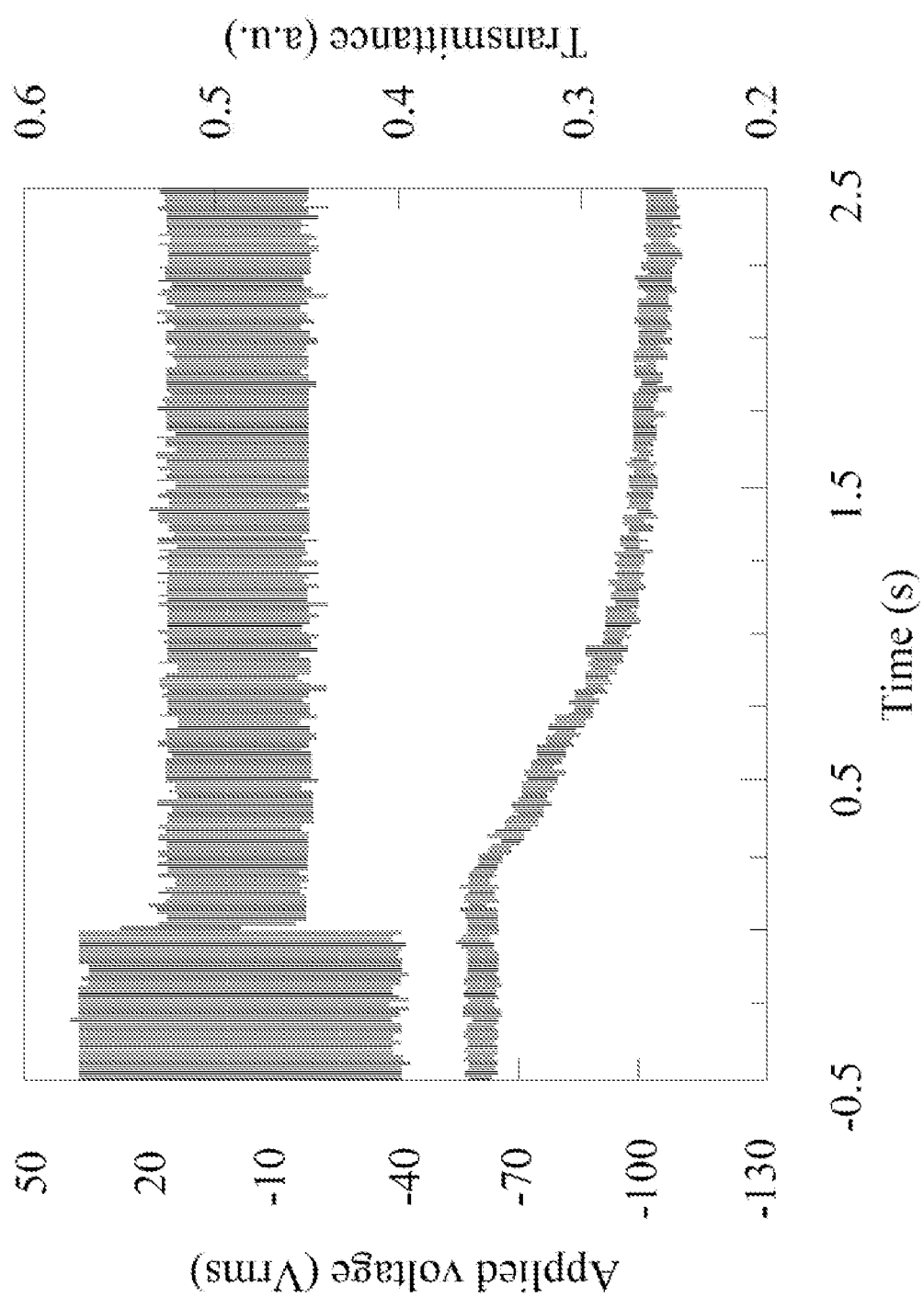
FIG. 9 is a graph showing a second embodiment of the driving method according to the present invention.

FIG. 9 is a graph showing a second embodiment of the driving method according to the present invention.

First, an operating voltage of 35 Vrms is provided.

Then, the operating voltage is switched from 35 Vrms to 15 Vrms.

In the second embodiment of the driving method, the applied voltage is switched from a higher operating voltage to a lower operating voltage with a voltage fall time of 1 second.

Figure 10:
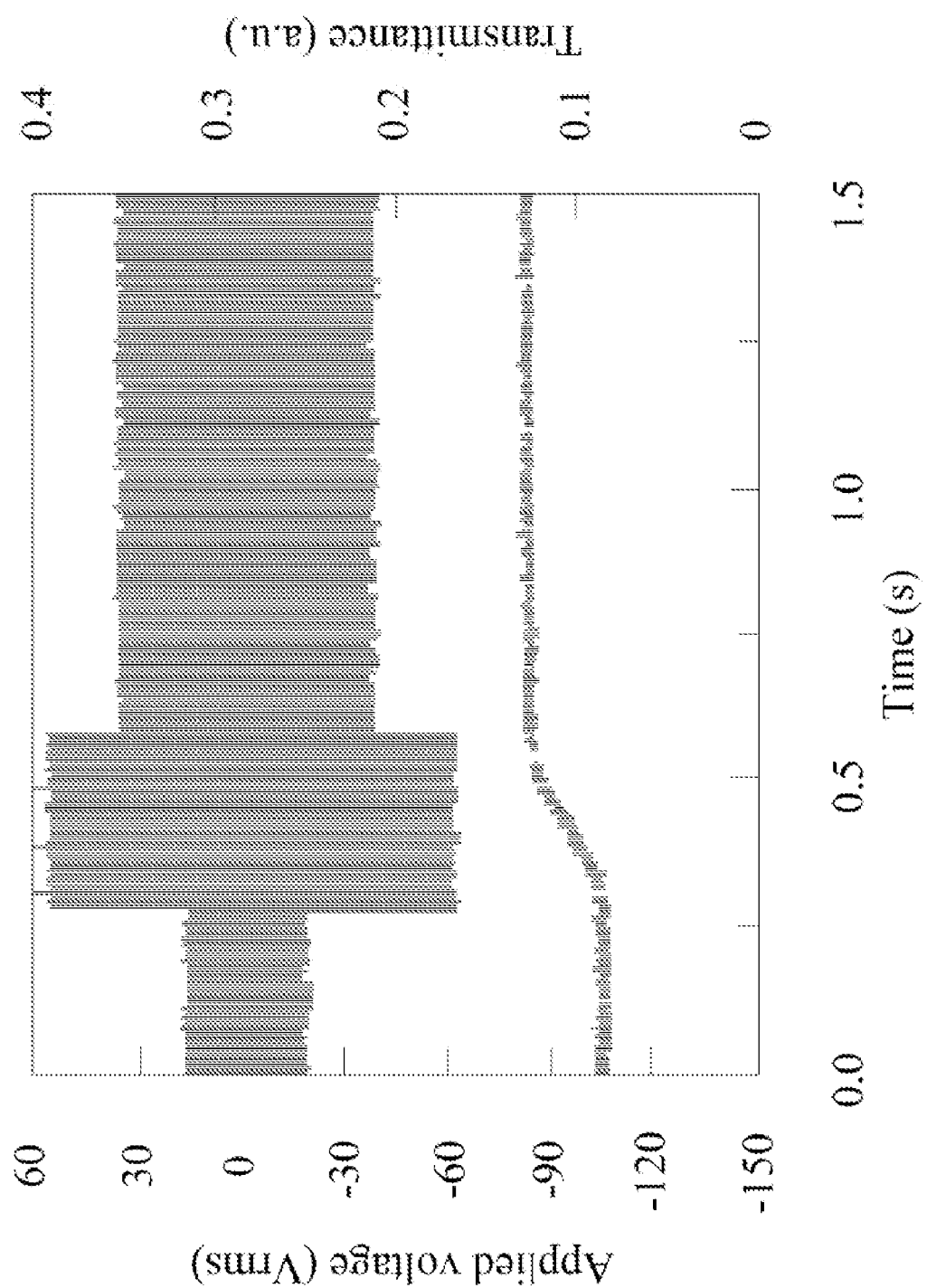
FIG. 10 is a graph showing a third embodiment of the driving method according to the present invention.

Please refer to FIG. 10, which is a graph showing a third embodiment of the driving method according to the present invention.

First, an operating voltage of 15 Vrms is provided.

Then, the operating voltage is switched from 15 Vrms to 55 Vrms.

Finally, the operating voltage is switched from 55 Vrms to 35 Vrms.

In the third embodiment of the driving method, a pulse of 55 Vrms with a pulse time of 298 ms is applied during the voltage rise time, in order to accelerate the reorientation of the liquid crystal molecules.

Figure 11:
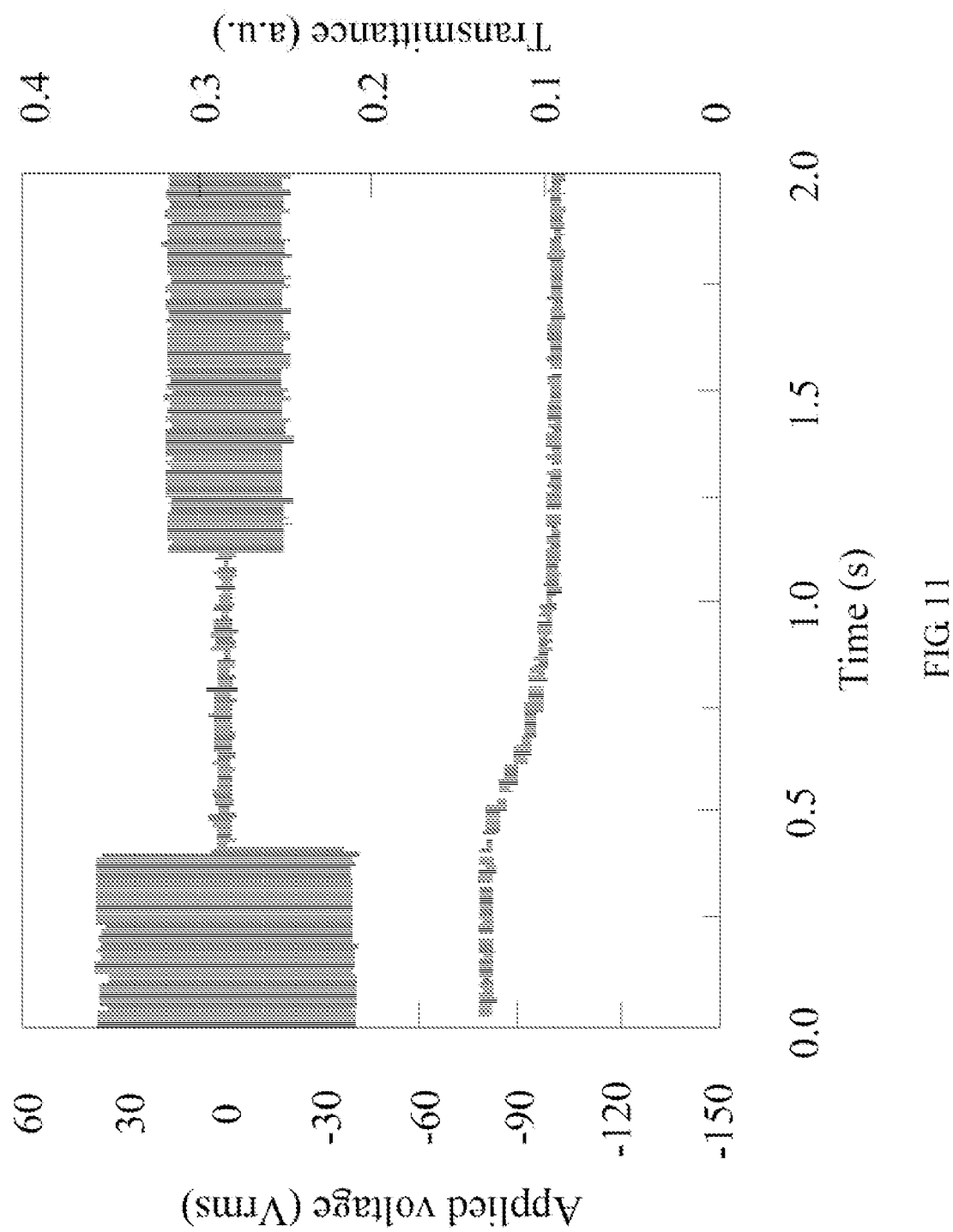
FIG. 11 is a graph showing a fourth embodiment of the driving method according to the present invention.

Please refer to FIG. 11, which is a graph showing a fourth embodiment of the driving method according to the present invention.

First, an operating voltage of 35 Vrms is provided.

Then, the operating voltage is switched from 35 Vrms to 0 Vrms.

Finally, the operating voltage is switched from 0 Vrms to 15 Vrms.

In the fourth embodiment of the driving method, a pulse of 0 Vrms with a pulse time of 737 ms is applied during the voltage fall time, in order to assist the liquid crystal to return to its original orientation. In the present invention, by switching a first operating voltage to a second operating voltage and switching the second operating voltage to a third operating voltage, the LC lens can have a response time changed from the original 1.47 seconds to 0.64 seconds to further increase the response speed of the LC lens.

By building a liquid crystal and polymer composite film 13 in the LC lens structure 1, the present invention realizes an LC lens with low operating voltage and large focusing range. The liquid crystal and polymer composite film 13 has non-uniform dielectric constant distribution, and can be used as the alignment layer of the LC lens and has a fixed focal length. The LC layer 14 and the liquid crystal and polymer composite film 13 together contribute to the focal length of the LC lens. More specifically, the LC layer 14 contributes to electrical focusing while the liquid crystal and polymer composite film 13 contributes to a fixed focal length in the LC lens. Compared to the prior art LC lenses, the LC lens structure of the present invention has the advantages of low operating voltage, simple structure and reduced overall thickness, and provides increased applicability.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A liquid crystal (LC) lens structure, comprising:
   an upper substrate being provided with a first conductive layer and a first alignment layer; the first conductive layer being located at one side of the upper substrate, and the first alignment layer being located at one side of the first conductive layer opposite to the upper substrate;
   a lower substrate being provided with a second conductive layer and a second alignment layer; the second conductive layer being located at one side of the lower substrate, and the second alignment layer being located at one side of the second conductive layer opposite to the lower substrate;
   a liquid crystal and polymer composite film being arranged at one side of the first alignment layer opposite to the first conductive layer to form a first lens; and
   a liquid crystal (LC) layer being arranged between the liquid crystal and polymer composite film and the second alignment layer to form a second lens.

2. The LC lens structure as claimed in claim 1, wherein the liquid crystal and polymer composite film is formed of liquid crystal and monomers of a polymer.

3. The LC lens structure as claimed in claim 1, wherein the liquid crystal and polymer composite film is a birefringent film.

4. The LC lens structure as claimed in claim 1, wherein the first conductive layer is formed with a hole.

5. The LC lens structure as claimed in claim 4, wherein the hole has a diameter of 2 mm.

6. The LC lens structure as claimed in claim 1, wherein the liquid crystal and polymer composite film has equivalent refractive index and dielectric constant distributed in circular symmetry.

7. The LC lens structure as claimed in claim 1, wherein the liquid crystal and polymer composite film has uniform dielectric constant distribution.

8. The LC lens structure as claimed in claim 1, wherein the liquid crystal and polymer composite film has non-uniform dielectric constant distribution.

9. The LC lens structure as claimed in claim 1, wherein the first lens can be any one of a positive lens and a negative lens.

10. The LC lens structure as claimed in claim 1, wherein the LC lens structure can be applied in any one of eye glasses, a mini projector, a mobile phone camera system, and any portable device that requires an electrically tunable-focus element.

11. The LC lens structure as claimed in claim 1, wherein the LC lens structure has an operating voltage range from 15 Vrms to 35 Vrms.

12. A driving method for driving an LC lens structure as claimed in claim 1, comprising the following steps:
    providing a first operating voltage; and
    switching the first operating voltage to a second operating voltage.

13. The driving method as claimed in claim 12, wherein the first operating voltage is 15 Vrms, and the second operating voltage is 35 Vrms.

14. The driving method as claimed in claim 12, wherein the first operating voltage is 35 Vrms, and the second operating voltage is 15 Vrms.

15. The driving method as claimed in claim 12, further comprising the following step after the first operating voltage has been switched to the second operating voltage:

switching the second operating voltage to a third operating voltage.

16. The driving method as claimed in claim 15, wherein the first operating voltage is 15 Vrms, the second operating voltage is 55 Vrms, and the third operating voltage is 35 Vrms.

17. The driving method as claimed in claim 15, wherein the first operating voltage is 35 Vrms, the second operating voltage is 0 Vrms, and the third operating voltage is 15 Vrms.

* * * * *